(12) United States Patent
Yoon et al.

(10) Patent No.: US 8,007,875 B2
(45) Date of Patent: Aug. 30, 2011

(54) METHOD OF FORMING A CARBON NANO-TUBE

(75) Inventors: Hong-Sik Yoon, Seoul (KR); Young-Moon Choi, Seoul (KR); Sun-Woo Lee, Incheon (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 991 days.

(21) Appl. No.: 11/832,601

(22) Filed: Aug. 1, 2007

(65) Prior Publication Data
US 2008/0175984 A1  Jul. 24, 2008

(30) Foreign Application Priority Data

Aug. 2, 2006  (KR) .................. 10-2006-0072908

(51) Int. Cl.
*H05H 1/24* (2006.01)
(52) U.S. Cl. .............. 427/577; 427/248.1; 427/249.1; 427/569; 423/445 R; 423/448; 977/742
(58) Field of Classification Search .................. None
See application file for complete search history.

(56) References Cited

U.S. PATENT DOCUMENTS

| | | | |
|---|---|---|---|
| 6,350,488 B1 * | 2/2002 | Lee et al. ............ | 427/249.1 |
| 6,649,431 B2 | 11/2003 | Merkulov et al. | |
| 2005/0089467 A1 * | 4/2005 | Grill et al. ............ | 427/569 |
| 2005/0095780 A1 | 5/2005 | Gutsche et al. | |
| 2006/0008594 A1 * | 1/2006 | Kang et al. ............ | 427/569 |
| 2006/0134329 A1 * | 6/2006 | Wei et al. ............ | 427/248.1 |
| 2006/0141153 A1 * | 6/2006 | Kubota et al. ............ | 427/249.1 |
| 2007/0259128 A1 * | 11/2007 | Parsapour ............ | 427/569 |
| 2008/0032238 A1 * | 2/2008 | Lu et al. ............ | 430/322 |

FOREIGN PATENT DOCUMENTS

| | | |
|---|---|---|
| JP | 2004-103802 | 4/2004 |
| JP | 2005-53709 | 3/2005 |
| JP | 2005-272271 | 10/2005 |
| KR | 2002-0001260 | 1/2002 |
| KR | 10-2004-0043043 | 5/2004 |
| KR | 10-2004-0043167 | 5/2004 |
| KR | 10-2004-0084773 | 10/2004 |

OTHER PUBLICATIONS

Qin et al (Applied Physics Letters vol. 72, No. 26 pp. 3437-3439).*
English language abstract of Korean Publication No. 2002-0001260.
English language abstract of Japanese Publication No. 2004-103802.
English language abstract of Korean Publication No. 10-2004-0043043.

(Continued)

*Primary Examiner* — David Turocy
*Assistant Examiner* — Joel G Horning
(74) *Attorney, Agent, or Firm* — Harness, Dickey & Pierce, PLC (57) ABSTRACT

In a method of forming carbon nano-tubes, a catalytic film is formed on a substrate. The catalytic film is then transformed into preliminary catalytic particles. Thereafter, the preliminary catalytic particles are transformed into catalytic particles. Carbon nano-tubes then grow from the catalytic particles. The carbon nano-tubes have relatively high conductivity and high number density.

20 Claims, 5 Drawing Sheets

OTHER PUBLICATIONS

English language abstract of Korean Publication No. 10-2004-0043167.
English language abstract of Korean Publication No. 10-2004-0084773.
English language abstract of Japanese Publication No. 2005-53709.
English language abstract of Japanese Publication No. 2005-272271.

* cited by examiner

METHOD OF FORMING A CARBON NANO-TUBE

CROSS-REFERENCE TO RELATED APPLICATION

This application claims priority under 35 U.S.C. §119 to Korean Patent Application No. 10-2006-0072908, filed on Aug. 2, 2006 in the Korean Intellectual Property Office, the disclosure of which is incorporated herein by reference in its entirety.

BACKGROUND

1. Technical Field

The present invention relates to a method of forming a carbon nano-tube. More particularly, the present invention relates to a method of forming carbon nano-tubes having relatively high conductivity and high number density.

2. Description of the Related Art

Carbon nano-tubes are cylindrical structures with diameters on the order of nanometers. Because of their unique electrical and physical properties, carbon nano-tubes are the subject of intense research for many applications. One such application is in semiconductor devices. A semiconductor device may be formed using a carbon nano-tube. Examples of methods of forming the semiconductor device that has the carbon nano-tube are disclosed in Korean Patent Laid-open Publication No. 2002-1260, Japanese Patent Laid-open Publication No. 2004-103802, U.S. Patent Application Publication No. 2005-95780 and Korean Patent Laid-open Publication No. 2004-43043.

In the conventional methods, the carbon nano-tube is used as a channel where electrons move. Thus, the more carbon nano-tubes there are in the semiconductor device channel, the greater the reliability of the semiconductor device. Accordingly, a method of forming the carbon nano-tubes capable of increasing the number of carbon nano-tubes per unit area has been widely researched.

In a conventional method of forming the carbon nano-tube, a catalytic film is initially formed on a substrate. A chemical vapor deposition (CVD) process is performed on the catalytic film, so that the catalytic film may be transformed into a plurality of catalytic particles. A CVD process is then performed on the catalytic particle so that a carbon nano-tube may grow from each of the catalytic particles.

However, in the case that a conventional CVD process is employed for forming the carbon nano-tube, the catalytic particles may be combined with one another by thermal dynamic reactions so that the number of catalytic particles may decrease. As a result, the number of carbon nano-tubes each growing from the catalytic particles may also decrease.

In addition, the conventional CVD process is used for forming the carbon nano-tube from the catalytic film, but the conventional CVD process may not be efficiently controllable for growth by stages. The present invention addresses these and other disadvantages of the conventional art.

SUMMARY

An embodiment of the present invention provides a method of forming carbon nano-tubes having relatively high conductivity and high number density.

In accordance with an aspect of the present invention, in the method of forming a carbon nano-tube, a catalytic film is formed on a substrate. The catalytic film is transformed into preliminary catalytic particles. The preliminary catalytic particles are transformed into catalytic particles. The carbon nano-tubes grow from the catalytic particles.

According to some embodiments of the present invention, the number of carbon nano-tubes may increase. In addition, a process for forming the carbon nano-tubes is subdivided such that the process is efficiently controlled. Furthermore, various kinds of catalysts may be employed because a catalytic film is formed before the carbon nano-tubes are formed.

BRIEF DESCRIPTION OF THE DRAWINGS

The above and other advantages of the present invention will become readily apparent by reference to the following detailed description when considered in conjunction with the accompanying drawings in which.

DETAILED DESCRIPTION

Embodiments of the present invention will be described with reference to the accompanying drawings. The present invention may, however, be embodied in many different forms and should not be construed as limited to the embodiments set forth herein. Rather, the embodiments are provided so that disclosure of the present invention will be thorough and complete, and will fully convey the scope of the present invention to those skilled in the art. The principles and features of this invention may be employed in varied and numerous embodiments without departing from the scope of the present invention. In the drawings, the size and relative sizes of layers and regions may be exaggerated for clarity. The drawings are not necessarily to scale. Like reference numerals designate like elements throughout the drawings.

It will also be understood that when an element or layer is referred to as being "on," "connected to" and/or "coupled to" another element or layer, the element or layer may be directly on, connected and/or coupled to the other element or layer or intervening elements or layers may be present. In contrast, when an element is referred to as being "directly on," "directly connected to" and/or "directly coupled to" another element or layer, no intervening elements or layers are present. As used herein, the term "and/or" may include any and all combinations of one or more of the associated listed items.

It will also be understood that, although the terms first, second, etc. may be used herein to describe various elements, components, regions, layers and/or sections. These elements, components, regions, layers and/or sections should not be limited by these terms. These terms may be used to distinguish one element, component, region, layer and/or section from another element, component, region, layer and/or section. For example, a first element, component, region, layer and/or section discussed below could be termed a second element, component, region, layer and/or section without departing from the teachings of the present invention.

Spatially relative terms, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

The terminology used herein is for the purpose of describing particular embodiments only and is not intended to be limiting of the invention. As used herein, the singular terms "a," "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence and/or addition of one or more other features, integers, steps, operations, elements, components, and/or groups thereof.

Unless otherwise defined, all terms (including technical and scientific terms) used herein may have the same meaning as what is commonly understood by one of ordinary skill in the art. It will be further understood that terms, such as those defined in commonly used dictionaries, should be interpreted as having a meaning that is consistent with their meaning in the context of this specification and the relevant art and will not be interpreted in an idealized and/or overly formal sense unless expressly so defined herein.

Embodiments of the present invention are described with reference to cross-section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated as a rectangle will, typically, have rounded or curved features. Thus, the regions illustrated in the figures are schematic in nature of a device and are not intended to limit the scope of the present invention.

FIGS. 1 to 4 are cross-sectional views illustrating a method of manufacturing a carbon nano-tube in accordance with an embodiment of the present invention.

Figure 1:
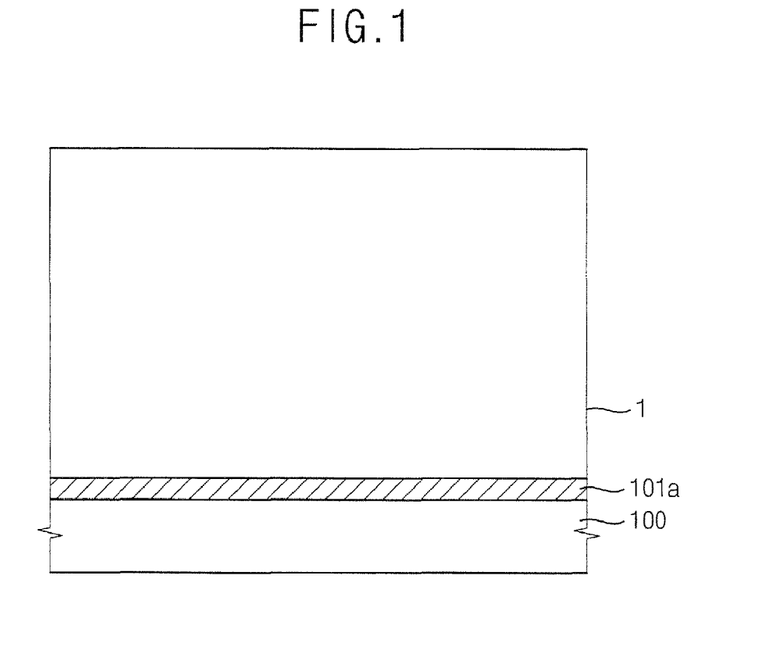
FIGS. 1 to 4 are cross-sectional views illustrating a method of forming a carbon nano-tube in accordance with an embodiment of the present invention.

Referring to FIG. 1, a chemical vapor deposition (CVD) process may be performed on a substrate 100 provided in a chamber 1, which may be required for the CVD process, so that a catalytic film 101a may be formed. The substrate 100 may include an insulating material such as silicon oxide and silicon nitride. Alternatively, the substrate 100 may be formed using a conductive material such as a metal, an alloy and a doped polysilicon.

The catalytic film 101a may include a transition metal in which carbon may be dissolved. For example, the transition metal may be titanium (Ti), chromium (Cr), manganese (Mn), iron (Fe), cobalt (Co), nickel (Ni), ruthenium (Ru), lead (Pd), silver (Ag), etc.

Figure 2:
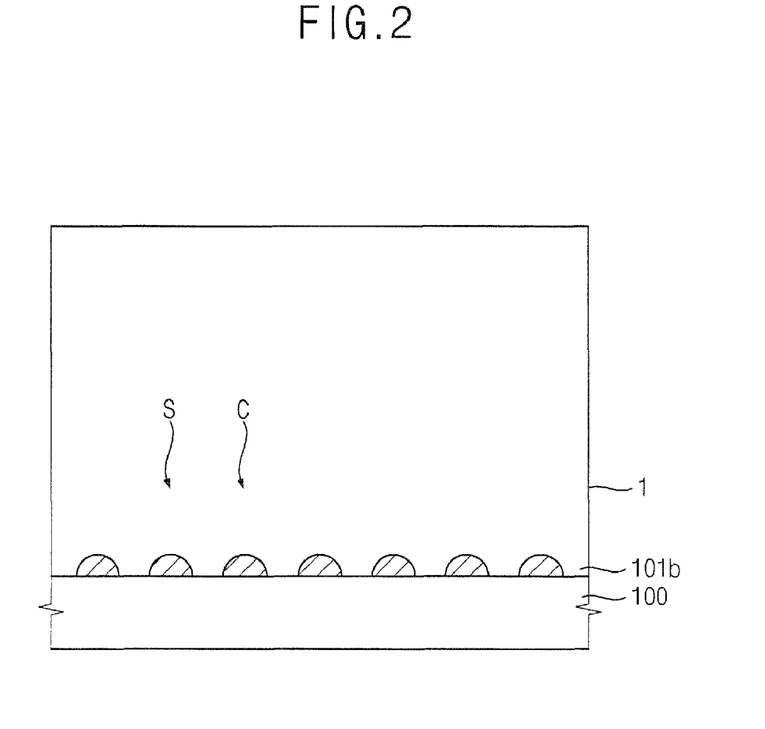

Referring to FIG. 2, a source gas S and a carrier gas C may be provided to the catalytic film 101a so that the catalytic film 101a may be transformed into a plurality of preliminary catalytic particles 101b.

The source gas S may include a gas having carbon. The source gas S may include hydrogen carbon such as methane ($CH_4$), ethane ($C_2H_6$), and propane ($C_3H_8$). The carrier gas C may be an inert gas or an inactive gas. For example, the inert gas includes helium (He) gas, neon (Ne) gas, argon (Ar) gas or krypton (Kr) gas. For example, the inactive gas may include hydrogen ($H_2$) gas or nitrogen ($N_2$) gas.

The preliminary catalytic particle 101b may be formed using a relatively small amount of energy. In the case that the preliminary catalytic particle 101b may be formed using a relatively large amount of energy, carbon may be dissolved into the preliminary catalytic particle 101b so that a carbon nano-tube may be undesirably formed from the preliminary catalytic particle 101b. Thus, process conditions such as temperature, pressure, and time should be precisely controlled while the preliminary catalytic particle 101b may be formed. The process conditions used to form the layers, particles, and nano-tubes described herein may be referred to as process parameters and may include temperature, pressure, time, source gas type, carrier gas type, gas flow ratio, and the presence or absence of plasma.

Specifically, the preliminary catalytic particle 101b may be formed at a temperature of about 200° C. to about 500° C. In the case that the preliminary catalytic particle 101b may be attempted to be formed below about 200° C., the preliminary catalytic particle 101b may not be formed.

On the other hand, in the case that the preliminary catalytic particle 101b may be formed over about 500° C., the number of preliminary catalytic particles 101b may be relatively small. In addition, carbon may be dissolved into the preliminary catalytic particle 101b due to an increase in energy. Thus, the carbon nano-tube may not grow at a subsequent step.

Thus, the preliminary catalytic particle 101b may be preferably formed at a temperature of about 200° C. to about 500° C. For example, the preliminary catalytic particle 101b may be formed at a temperature of about 400° C.

That is, when the preliminary catalytic particle 101b may be formed at a relatively low temperature of about 200° C. to about 500° C., the preliminary catalytic particles 101b, having relatively small sizes, may be easily formed. In addition, the undesirable growth of the carbon nano-tube from the preliminary catalytic particle 101b can be prevented.

The preliminary catalytic particle 101b may be formed at a pressure of about 0.1 Torr to about 10 Torr. In the case that the preliminary catalytic particle 101b may be attempted to be formed at a pressure below about 0.1 Torr, the preliminary catalytic particle 101b may not be formed, whereas when the preliminary catalytic particle 101b may be formed at a pressure over about 10 Torr, energy in the chamber 1 may increase. Thus, carbon may be dissolved into the preliminary catalytic particle 101b so that a carbon nano-tube may undesirably grow.

Thus, the preliminary catalytic particle 101b may be formed at a pressure of about 1 Torr to about 10 Torr. For example, the preliminary catalytic particle 101b may be formed at a pressure of about 1.5 Torr.

The preliminary catalytic particle 101b may be formed for about 0.1 sec to about 300 sec. In the case that a time used for forming the preliminary catalytic particle 101b may be below about 0.1 sec, the preliminary catalytic particle 101b may not be formed, whereas when a time used for forming the preliminary catalytic particle 101b may be over about 300 sec, the energy in the chamber 1 may increase. Thus, carbon may be dissolved into the preliminary catalytic particle 101b so that a carbon nano-tube may undesirably grow.

Thus, the preliminary catalytic particle 101b may be formed for about 0.1 sec to about 300 sec. For example, the preliminary catalytic particle 101b may be formed for about 60 sec.

Plasma may not be generated in the chamber 1 when the preliminary catalytic particle 101b may be formed. In the case that plasma may be generated in the chamber 1, energy in the chamber 1 may increase so that a carbon nano-tube may undesirably grow from the preliminary catalytic particle 101b.

Here, the preliminary catalytic particle 101b may not include carbon. However, the preliminary catalytic particle 101b may include a small portion of carbon because a source gas S including carbon may be used to form the preliminary catalytic particle 101b. Even when the preliminary catalytic particle 101b includes carbon, the amount of carbon in the preliminary catalytic particle 101b may be negligible. Thus, the amount of carbon in the preliminary catalytic particle 101b may not be sufficient to grow a carbon nano-tube.

Figure 3:
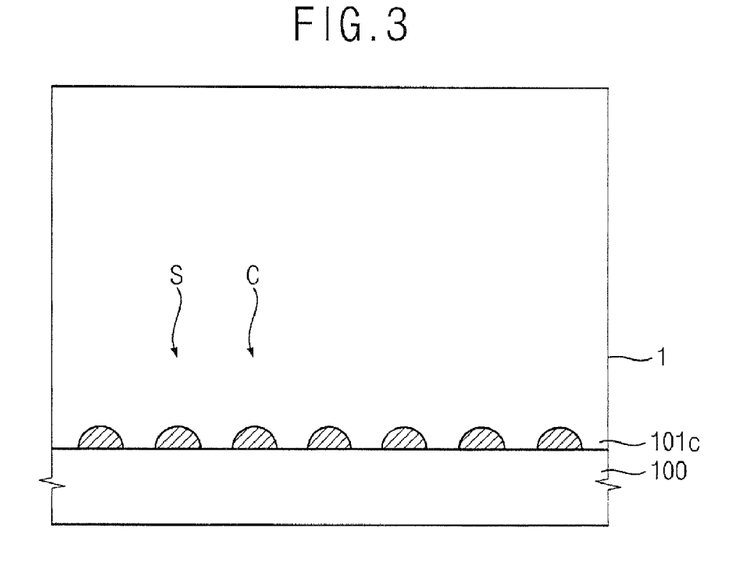

Referring to FIG. 3, the preliminary catalytic particle 101b may be transformed into a catalytic particle 101c. The number of catalytic particles 101c may be substantially the same as that of the preliminary catalytic particles 101b.

The catalytic particle 101c may be formed at a relatively low temperature. That is, the catalytic particle 101c as well as the preliminary catalytic particle 101b may be formed at a relatively low temperature. When the catalytic particle 101c may be formed at a temperature substantially higher than that at which the preliminary catalytic particle 101b may be formed, the catalytic particles 101c may become joined, thereby decreasing the number of catalytic particles 101c. The catalytic particle 101c may be formed at a temperature of about 200° C. to about 500° C. For example, the catalytic particle 101c may be formed at a temperature of about 400° C.

A predetermined amount of carbon may be dissolved in the catalytic particle 101c. However, the amount of carbon dissolved in the catalytic particle 101c may not be sufficient to grow a carbon nano-tube. That is, the catalytic particle 101c may not be saturated with carbon. However, graphite may be partially formed at a surface of the catalytic particle 101c. The amount of graphite may be insignificant, though.

Plasma may be generated in the chamber 1 when the catalytic particle 101c may be formed to dissolve a predetermined amount of carbon into the catalytic particle 101c. Here, energy required for dissolving the predetermined amount of carbon in the catalytic particle 101c may be obtained from the plasma.

The catalytic particle 101c may be formed for about 0.1 sec to about 60 sec. In the case that a time used for forming the catalytic particle 101c may be less than about 0.1 sec, the catalytic particle 101c may not be formed, whereas in the case that a time used for forming the catalytic particle 101c may be over about 60 sec, the energy in the chamber 1 may increase. Thus, a relatively large amount of carbon may be dissolved in the preliminary catalytic particle 101c. As a result, a carbon nano-tube may undesirably grow. In addition, in the case that the relatively large amount of carbon may be dissolved in the catalytic particle 101c, a carbon nano-tube may not efficiently grow from the catalytic particle 101c in a subsequent process for growing the carbon nano-tube from the catalytic particle 101c.

The catalytic particle 101c may be formed at a pressure of about 0.1 Torr to about 10 Torr. In the case that the pressure at which the catalytic particle 101c may be attempted to be formed may be below about 0.1 Torr, the catalytic particle 101c may not be formed. On the other hand, in the case that the pressure at which the catalytic particle 101c may be formed may be over about 10 Torr, the energy in the chamber 1 may increase. Thus, a relatively large amount of carbon may be dissolved in the catalytic particle 101c. As a result, a carbon nano-tube may undesirably grow.

Thus, the catalytic particle 101c may be formed at a pressure of about 1 Torr to about 10 Torr. For example, the catalytic particle 101c may be formed at about 1.5 Torr.

Figure 4:
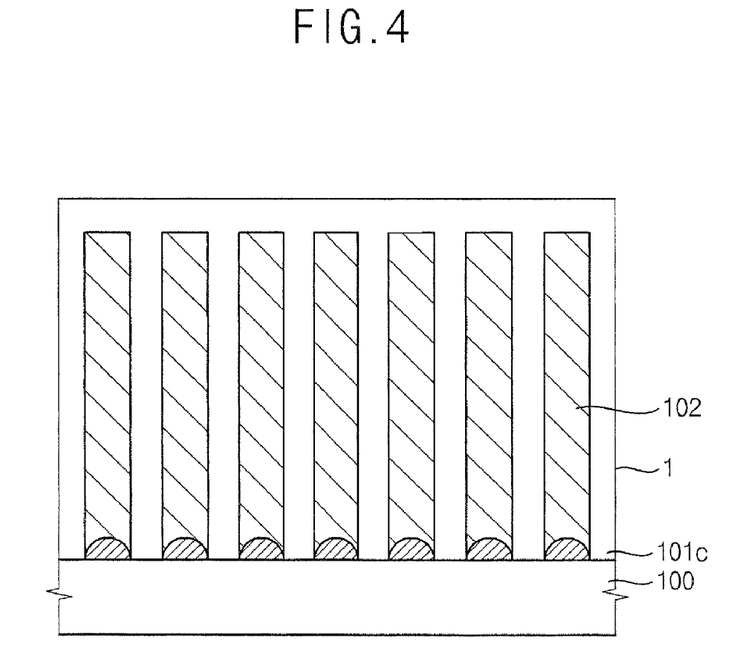

Referring to FIG. 4, a carbon nano-tube 102 may grow from the catalytic particle 101c. Particularly, a relatively large amount of carbon may be dissolved in the catalytic particle 101c. Carbon may be separated from a source material included in a source gas S by energy in the chamber The separated carbon may then be dissolved in the catalytic particle 101c. Alternatively, carbon may be separated from a source material absorbed in a surface of the catalytic particle 101c by energy in the chamber. The separated carbon may then be dissolved in the catalytic particle 101c.

The carbon may be combined with a transition metal in the surface of the catalytic particle 101c or inside the catalytic particle 101c. In the case that a supply of carbon continues, the amount of carbon in the catalytic particle 101c may become saturated.

In the case that the amount of carbon in the catalytic particle 101c may be saturated, residual carbon not capable of dissolving in the catalytic particle 101c may be separated from the surface of the catalytic particle 101c as graphite having a relatively stable structure.

Graphite may vertically grow a carbon nano-tube 102 on the catalytic particle 101c because an area of a surface of the catalytic particle 101c may be confined.

A relatively large amount of energy may be required to dissolve a relatively large amount of carbon into the catalytic particle 101c for growing the carbon nano-tube 102. Thus, process conditions may be adjusted to obtain the relatively large amount of energy.

Particularly, the carbon nano-tube 102 may grow at a relatively high temperature. This is because the relatively large amount of energy for growing the carbon nano-tube 102 may be obtained at the relatively high temperature.

In the case that a temperature at which the carbon nano-tube 102 grows may be below about 500° C., an amount of energy required therein may be relatively small. Thus, the amount of carbon dissolved in the catalytic particle 101c may be relatively small. As a result, the carbon nano-tube 102 may not efficiently grow. On the other hand, in the case that the carbon nano-tube 102 may grow at a temperature over about 800° C., the catalytic particle 101c may be undesirably melted by the heat. Thus, the carbon nano-tube 102 may grow at a temperature of about 500° C. to about 800° C.

In the case that the carbon nano-tube 102 grows at a pressure below about 0.1 Torr, a growth rate of the carbon nano-tube 102 may be relatively low. On the other hand, in the case that the carbon nano-tube 102 grows at a pressure over about 10 Torr, a growth rate of the carbon nano-tube 102 may not be efficiently controlled. Thus, the carbon nano-tube 102 may grow at a pressure of about 0.1 Torr to about 10 Torr. For example, the carbon nano-tube 102 may grow at a pressure of about 5 Torr.

Here, a growth rate of the carbon nano-tube 102 may increase when a pressure increases. Thus, a pressure at which the carbon nano-tube 102 grows may be greater than a pressure at which the preliminary catalytic particle 101b or the catalytic particle 101c may be formed.

Plasma may be preferably generated in the chamber 1 when the carbon nano-tube 102 grows. This is because the relatively large energy required to dissolve the relatively large amount of carbon into the catalytic particle 101c may be efficiently obtained from the plasma.

Experiments Concerning a Preliminary Catalytic Particle

Figure 5:
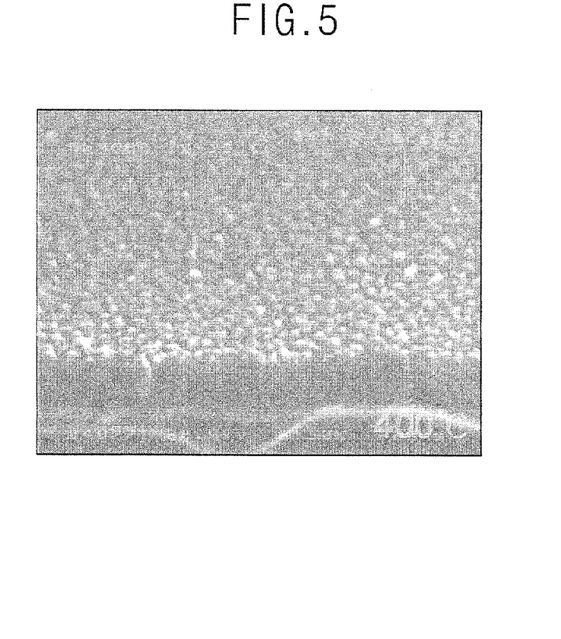
FIGS. 5 and 6 are scanning electron microscope (SEM) images illustrating a preliminary catalytic particle formed in an experiment concerning the preliminary catalytic particle.

Several experiments were performed concerning the growth conditions of the preliminary catalytic particle. In one experiment, a substrate including silicon oxide was provided. A catalytic film including nickel was formed on the substrate. The catalytic film was provided with methane and hydrogen so that the catalytic film was transformed into a plurality of preliminary catalytic particles. Here, a flow ratio of methane to hydrogen was about 1:4. In addition, it required a temperature of about 400° C. and a pressure of about 1 Torr for about 1 minute in order to transform the catalytic film into the preliminary catalytic particles. FIG. 5 is a scanning electron microscope (SEM) image illustrating the preliminary catalytic particles formed by the above-described processes.

Figure 6:
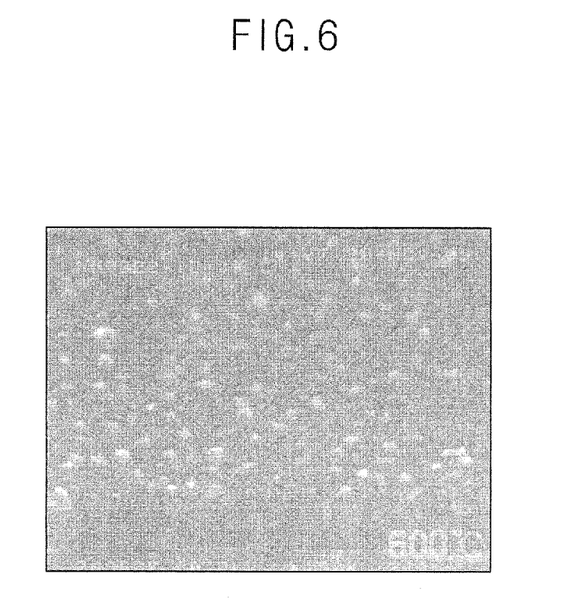

In another experiment, a substrate including silicon oxide was provided. A catalytic film was formed on the substrate including nickel. The catalytic film was provided with methane and hydrogen so that the catalytic film was transformed into a plurality of preliminary catalytic particles. Here, a flow ratio of methane to hydrogen was about 1:4. A temperature of about 600° C. and a pressure of about 1 Torr for about 1 minute were required in order to transform the catalytic film into the preliminary catalytic particles. FIG. 6 is a scanning electron microscope (SEM) image illustrating the preliminary catalytic particles formed by the above-described processes.

Referring to FIGS. 5 and 6, a number density of the preliminary catalytic particles in FIG. 5 and a number density of the preliminary catalytic particles in FIG. 6 were about $6.89 \times 10^{10}/cm^2$ and about $4.38 \times 10^{10}/cm^2$, respectively. That is, the number of preliminary catalytic particles may increase where the preliminary catalytic particles may be formed at a relatively low temperature rather than where the preliminary catalytic particles may be formed at a relatively high temperature.

Experiments Concerning a Carbon Nano-Tube

An experiment was performed concerning the growth conditions of the carbon nano-tubes. A catalytic film including nickel was formed on a substrate including silicon oxide. The substrate was provided with methane and hydrogen so that the catalytic film was transformed into a plurality of preliminary catalytic particles. Here, a flow ratio of methane to hydrogen was about 1:4. Further, it required a temperature of about 400° C. and a pressure of about 1 Torr for about 1 minute in order to transform the catalytic film into the preliminary catalytic particles. Furthermore, plasma was not employed for forming the preliminary catalytic particles.

The preliminary catalytic particles were then provided with methane and hydrogen so that the preliminary catalytic particles were transformed into catalytic particles. Here, a flow ratio of methane to hydrogen was about 1:4. Further, it required a temperature of about 400° C. and a pressure of about 1 Torr for about 5 sec in order to transform the preliminary catalytic particles into the catalytic particles. Furthermore, plasma was employed for forming the catalytic particles.

The catalytic particles were then provided with methane and hydrogen so that a carbon nano-tube grown from the catalytic particle. Here, a flow ratio of methane to hydrogen was about 1:4. Further, a temperature was about 600° C. and a pressure was about 5 Torr. Furthermore, plasma was employed to grow the carbon nano-tube.

Figure 7:
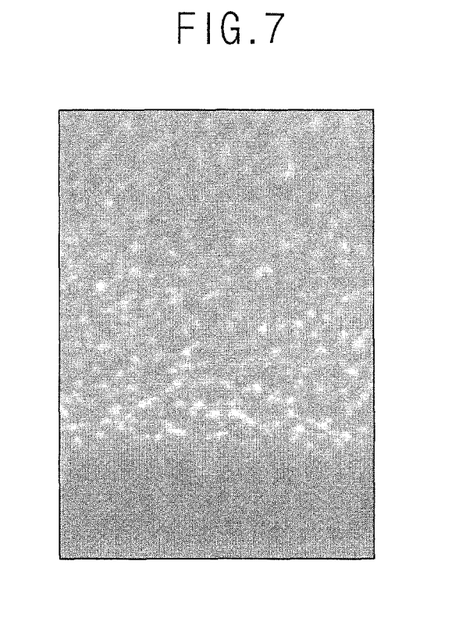
FIG. 7 is an SEM image illustrating a preliminary catalytic particle formed in an experiment concerning a carbon nano-tube.

FIG. 7 is a scanning electron microscope (SEM) image illustrating the preliminary catalytic particles formed in the above-described experiment. Referring to FIG. 7, the preliminary catalytic particles had a relatively large number density.

Figure 8:
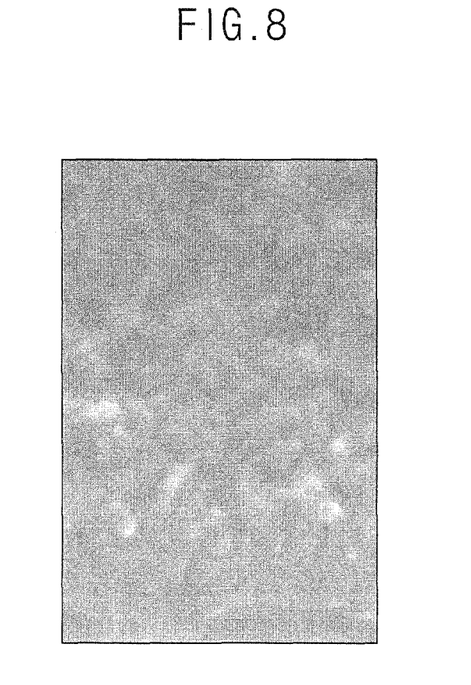
FIG. 8 is an SEM image illustrating a catalytic particle formed in the experiment concerning the carbon nano-tube.

FIG. 8 is a scanning electron microscope (SEM) image illustrating the catalytic particles transformed from the preliminary catalytic particles. Referring to FIG. 8, the preliminary catalytic particles were not combined with one another so that each of the preliminary catalytic particles was transformed into a catalytic particle. Thus, the number of preliminary catalytic particles was substantially the same as the number of the catalytic particles.

Figure 9:
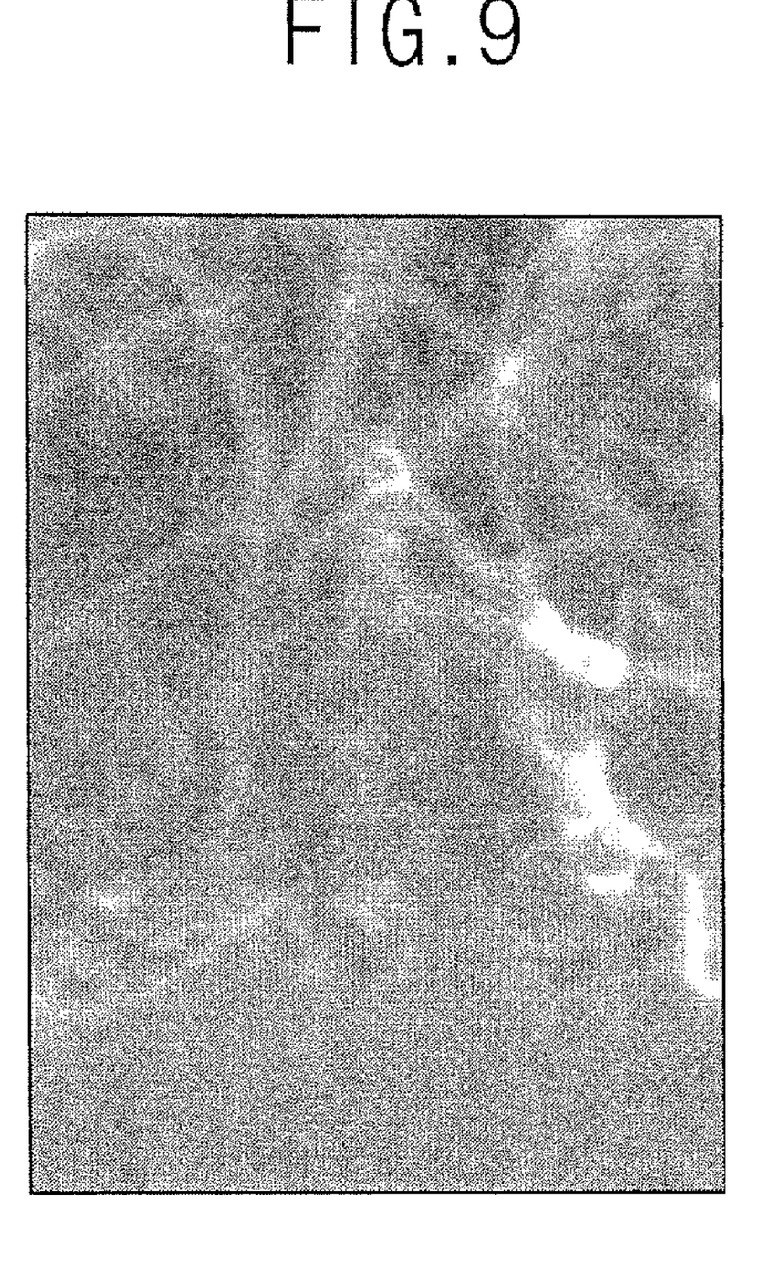
FIG. 9 is an SEM image illustrating the carbon nano-tube formed in the experiment concerning the carbon nano-tube.

FIG. 9 is a scanning electron microscope (SEM) image illustrating the carbon nano-tubes growing from the catalytic particles. Referring to FIG. 9, a number density of the carbon nano-tubes may be relatively large because of the carbon nano tubes growing from the catalytic particles.

According to the present invention, the number of carbon nano-tubes may increase. In addition, a process for forming the carbon nano-tubes may be subdivided such that the process may be efficiently controlled. Furthermore, various kinds of catalysts may be employed because a catalytic film may be formed before the carbon nano-tubes may be formed.

In accordance with one aspect of the present invention, in the method of forming a carbon nano-tube, a catalytic film may be formed on a substrate. The catalytic film may be transformed into preliminary catalytic particles. The preliminary catalytic particles may be transformed into catalytic particles. Carbon nano-tubes grow from the catalytic particles.

The catalytic film, the preliminary catalytic particles, the catalytic particles and the carbon nano-tubes may be formed by a chemical vapor deposition (CVD) process. The catalytic film may include a transition metal in which carbon may be dissolved.

The carbon nano-tubes may be formed by energy substantially larger than those required when the preliminary catalytic particles and the catalytic particles may be formed. The catalytic particles may be formed by energy substantially larger than that required when the preliminary catalytic particles may be formed.

The preliminary catalytic particles, the catalytic particles and the carbon nano-tubes may be formed using a source gas and a carrier gas. The source gas may include carbon. The carrier gas may include helium, neon, argon, krypton, hydrogen, nitrogen or a combination thereof.

The carbon nano-tubes may be formed at a temperature substantially higher than a temperature at which the preliminary catalytic particles and the catalytic particles may be formed. The carbon nano-tubes may be formed at a pressure substantially greater than a pressure at which the preliminary catalytic particles and the catalytic particles may be formed.

The preliminary catalytic particles may be formed without using a plasma. On the other hand, the catalytic particles and the carbon nano-tubes may be formed using a plasma.

The preliminary catalytic particles may be formed at a temperature of about 200° C. to 500° C. and a pressure of about 0.1 Torr to about 10 Torr for about 0.1 sec to 300 sec. The catalytic particles may be formed at a temperature of about 200° C. to about 500° C. and a pressure of about 0.1 Torr to about 10 Torr for about 0.1 sec to about 60 sec. The carbon nano-tubes may be formed at a temperature of about 500° C. to about 800° C. and a pressure of about 0.1 Torr to about 10 Torr.

The number of catalytic particles may be substantially the same as the number of preliminary catalytic particles. The catalytic particles may not be saturated with carbon before the carbon nano-tubes grow from the catalytic particles.

The foregoing is illustrative of the present invention and is not to be construed as limiting thereof. Although a few embodiments of this invention have been described, those skilled in the art will readily appreciate that many modifications are possible in the embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A method of forming carbon nano-tubes, the method comprising:
   forming a catalytic film on a substrate;
   transforming the catalytic film into preliminary catalytic particles using a source gas and a carrier gas without a plasma;
   transforming the preliminary catalytic particles into catalytic particles using a source gas, a carrier gas, and a plasma, to increase a carbon content to near saturation and without growing carbon nanotubes; and
   growing carbon nano-tubes from the catalytic particle using a source gas and a carrier gas at a greater temperature than the transforming of the preliminary catalytic particles,
   wherein the transforming of the catalytic film, the transforming of the preliminary catalytic particles and the growing of the carbon nanotubes are each performed using a different combination of process parameter setpoints.

2. The method of claim 1, wherein the catalytic film, the preliminary catalytic particles, the catalytic particles and the carbon nano-tubes are formed by chemical vapor deposition.

3. The method of claim 1, wherein the catalytic film includes a transition metal in which carbon is dissolved.

4. The method of claim 1, wherein the carbon nano-tubes are formed by energy substantially larger than energies that are required when the preliminary catalytic particles and the catalytic particles are formed.

5. The method of claim 4, wherein the catalytic particles are formed by energy substantially larger than that required when the preliminary catalytic particles is formed.

6. The method of claim 1, wherein the source gasses and the carrier gasses of the transforming of the catalytic film, the transforming of the preliminary catalytic particles, and the growing of the carbon nano-tubes, are a same source gas and a same carrier gas, and the source gas includes carbon, and the carrier gas includes at least one selected from the group consisting of helium, neon, argon, krypton, hydrogen and nitrogen.

7. The method of claim 1, wherein the carbon nano-tubes are formed at a temperature substantially higher than a temperature at which the preliminary catalytic particles and the catalytic particles are formed.

8. The method of claim 1, wherein the carbon nano-tubes are formed at a pressure substantially greater than a pressure at which the preliminary catalytic particles and the catalytic particles are formed.

9. The method of claim 1, wherein the preliminary catalytic particles are formed without using a plasma, and the catalytic particles and the carbon nano-tubes are formed by using a plasma.

10. The method of claim 1, wherein the preliminary catalytic particles are formed at a temperature of about 200.degree. C. to about 500.degree. C. and a pressure of about 0.1 Torr to about 10 Torr for about 0.1 sec to about 300 sec.

11. The method of claim 1, wherein the catalytic particles are formed at a temperature of about 200.degree. C. to about 500.degree. C. and a pressure of about 0.1 Torr to about 10 Torr for about 0.1 sec to about 60 sec.

12. The method of claim 1, wherein the carbon nano-tubes are formed at a temperature of about 500.degree. C. to about 800.degree. C. and a pressure of about 0.1 Torr to about 10 Torr.

13. The method of claim 1, wherein the number of catalytic particles is substantially the same as the number of preliminary catalytic particles, and wherein the catalytic particles are not saturated with carbon before the carbon nano-tubes grow from the catalytic particles.

14. A method of forming carbon nano-tubes, the method comprising:
    placing a substrate in a chamber;
    forming a catalytic film on the substrate;
    introducing a source gas and a carrier gas into the chamber and establishing first process parameters, thereby transforming the catalytic film into preliminary catalytic particles without a plasma, the source gas being different from the carrier gas;
    establishing second process parameters, thereby transforming the preliminary catalytic particles into catalytic particles with a plasma to increase a carbon content to near saturation and without growing carbon nanotubes; and
    establishing third process parameters, thereby growing carbon nano-tubes on the catalytic particles at a greater temperature than the establishing of the second process parameters,
    wherein a combination of process parameter setpoints of each of the first through third process parameters are different from each other.

15. The method of claim 14, wherein the first process parameters include:
    a source gas comprising methane;
    a carrier gas comprising hydrogen;
    a flow ratio of about 1:4;
    a temperature of about 200° C. to about 500° C.;
    a pressure of about 0.1 Torr to about 10 Torr;
    a substantial absence of plasma in the chamber; and
    a time of about 0.1 to about 300 seconds.

16. The method of claim 15, wherein the second process parameters include:
    a source gas comprising methane;
    a carrier gas comprising hydrogen;
    a flow ratio of about 1:4;
    a temperature of about 200° C. to about 500° C.;
    a pressure of about 0.1 Torr to about 10 Torr;
    a presence of plasma in the chamber; and
    a time of about 0.1 to about 60 seconds.

17. The method of claim 16, wherein the third process parameters include:
    a source gas comprising methane;
    a carrier gas comprising hydrogen;
    a flow ratio of about 1:4;
    a temperature of about 500° C. to about 800° C.;
    a pressure of about 0.1 Torr to about 10 Torr; and
    a presence of plasma in the chamber.

18. The method of claim 14, wherein the substrate comprises silicon oxide.

19. The method of claim 14, wherein the catalytic film comprises nickel.

20. The method of claim 14, wherein the catalytic film comprises carbon dissolved in a transition metal.

* * * * *